United States Patent Office 2,899,385
Patented Aug. 11, 1959

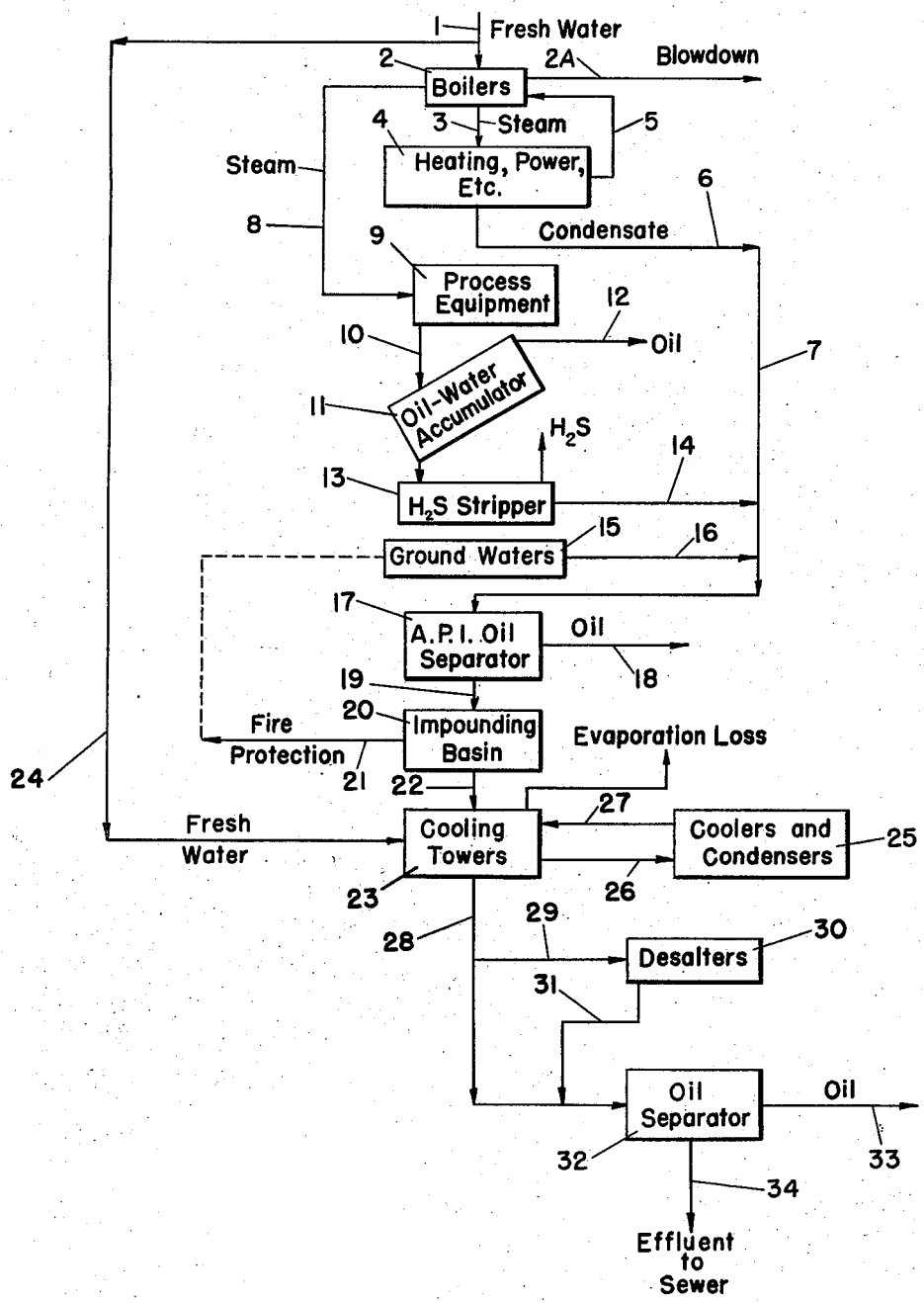

2,899,385

PROCESS FOR THE TREATMENT OF CONTAMINATED WASTE WATERS

Leo F. Connell, Wynnewood, Harold F. Elkin, Bala-Cynwyd, and William E. Soden, Swarthmore, Pa., assignors to Sun Oil Company, Philadelphia, Pa., a corporation of New Jersey Application June 2, 1955, Serial No. 512,820

3 Claims. (Cl. 208—208)

This invention relates to the management of industrial process waters, and more particularly to a system for the simultaneous conservation and purification of industrial water streams.

In many industrial processes, such as petroleum refining, water and steam are used to contact product streams, with resultant contamination of the water with chemicals, such as phenols, which have a high oxygen demand. These contaminated waters generally require treatment to reduce their impurity content, since municipal sewage treating plants are not ordinarily equipped to handle industrial wastes, and discharge into surface water streams in many areas will contaminate the water to an extent such as to destroy aquatic life and render it unfit for domestic use or consumption. In the past such contaminated waste waters have been purified by conventional sewage treatments in the plant before discharge therefrom, such as by subjecting the water to bacterial action in trickling filters, aeration basins or in ponds specially provided for this purpose. Such treating facilities involve a considerable capital investment, and means must also be supplied for warming them in the winter, since bacterial action, for all practical purposes, ceases at temperatures below about 60° F. In the case where settling ponds are used, provision must also be made for aerating and agitating the water.

While process water is available in copious quantities in most plant locations, adequate water supply may be a problem in many areas, such as the Southwest United States. Where water supply is inadequate, it is desirable that a minimum of water be disposed of as net effluent from the plant. In order to accomplish this desirable result, it has been proposed in the past to pass process waters that do not contain too high a proportion of dissolved solids to the cooling towers to provide makeup therefor. Heretofore, however, it has always been believed that the process waters passed to the cooling towers must be subjected to intensive purification prior to such use, in order to prevent corrosion and scale formation in the tubing through which water from the cooling towers is to be passed. Such purification requires a substantial investment for facilities, and the operating expense involved is considerable. It has also been the practice to add bactericides and algicides to the water circulating through the cooling towers, since it has been believed that bacterial sludge tends to deposit on the cooling tubes and reduce their heat exchange efficiency.

It is an object of this invention to substantially reduce the C.O.D. and B.O.D. of plant effluent waters without the necessity of providing purification facilities other than the facilities normally found in a plant which does not process its effluent water to remove phenols and other chemicals of high oxygen demand.

It is a further object of this invention to reduce plant water consumption by recycling process waters, without the necessity of providing any purification facilities other than those necessary in a once-through operation.

Other objects and advantages of the invention will become apparent as the disclosure proceeds.

We have found that these desirable objects may be attained by proceeding contrary to what were previously thought to be desirable conditions of operation, in that we pass directly to the cooling towers process waters highly contaminated with chemicals of high oxygen demand, without any previous treatment, other than conventional oil separation. We find that in so doing, there is no appreciable increase in corrosion or scale formation in the cooling water system, and that substantially all the high oxygen demand contaminants may be removed in the cooling towers by biochemical means. The bacterial sludge produced in the elimination of the contaminants is soft and flocculent, does not adhere to the walls of the condenser tubes to lower their heat exchange efficiency, and, as it builds up, may be easily removed from the system with the cooling tower blowdown water or by conventional backwashing. These results enable us to effect a large saving in the amount of water used, and also to eliminate any special processing steps for the reduction of C.O.D. and B.O.D. in plant effluents.

In order that those skilled in the art may more fully appreciate the nature of our invention and the means for carrying it out, it will be more particularly described in connection with the accompanying drawing, which is a diagrammatic flow sheet showing the progress of water, according to the present invention, from its entrance to an oil refinery as fresh water, to its exit therefrom as plant effluent. Plant equipment is shown in the drawing as blocks of equipment serving similar purposes, no attempt being made to show individual pieces, since the process equipment employed may vary widely from refinery to refinery, depending on the exact processes practiced therein.

Fresh water is taken from a suitable source of supply through line 1 and is fed to boilers or other steam generating means 2. A portion of the steam generated is taken through line 3 and is passed to heating and/or power means 4, which may consist of space heaters, indirect heat exchange heating equipment, or pump and other power equipment. A portion of the condensate recovered from such equipment, which has not come into contact with contaminants, is returned through line 5 to steam generation equipment 2 as make-up water, boiler blow-down water being discharged to the effluent sewer through line 2A. Condensate from the heating and power units which has come in contact with contaminants such as lubricating oil is taken off through line 6 and mixed with other plant water streams, as will be hereinafter described, in manifold 7.

Another portion of steam from boilers 2 is taken off through line 8 and is passed to process equipment 9 where it is contacted with various petroleum products. Process equipment 9 may include, and usually does include crude fractionating columns and product fractionators in which the steam is used as a stripping medium, and cracking equipment in which the steam is used to strip volatile hydrocarbons from catalysts. Condensate including water and hydrocarbons is removed from process equipment 9 through line 10 and is passed to an oil-water accumulator 11 in which the oil and water break into an upper phase of oil and a lower phase of water. The oil is removed through line 12 for further processing, and the water, which now contains a considerable amount of phenolic contaminates and hydrogen sulfide is passed to hydrogen sulfide stripper 13 in which the hydrogen sulfide is removed by scrubbing with flue gas. The phenol contaminated water is removed through line 14 and is mixed with the condensate from the heating and power units in manifold 7. Refinery ground waters 15, which may include storm water, water from storage tank bottoms, and windage from cooling towers, is passed through line 16 and is also mixed in manifold 7 with the water previously described.

This combined stream of water is then passed through oil separator 17 from which oil is removed through line 18, and the water is then passed through line 19 to impounding basin 20, in which water insolubles such as silt are separated by settling. The impounding basin serves as a reservoir from which water may be withdrawn through line 21 for fire protection use. In case of fire the water so withdrawn will be returned as by the dotted line in the drawing to the surface run-off and thence back to the impounding basin, so that in case of a serious fire, a continuous circulating stream is assured.

Normally all of the water passed into the impounding basin 20 will be withdrawn through line 22 and passed to cooling towers 23. In cooling towers 23, the water is subjected to bacterial activity to oxidize the phenols and a portion of the sulfides contained therein. It has been found that the cooling towers present an ideal environment for bacterial growth since the water therein will be maintained at a temperature of about 100° F., at all seasons of the year, and it contains scale inhibitors in the form of phosphates and also nitrogen compounds picked up from the oil by the make-up water, which provide an ideal nutrient medium for the bacteria. Also the high degree of aeration obtained in the towers is exceedingly favorable for bacterial oxidation. In case the water from impounding basin 20 is insufficient to furnish make-up water for the cooling towers, fresh water may be introduced through line 24 in an amount sufficient for that purpose.

The water from the cooling towers is circulated to coolers and condensers 25 through line 26 and is returned to cooling towers 23 through line 27. Circulation of the water is continued until an equilibrium amount of dissolved solids is built up in the water after which a regulated amount of cooling tower blowdown water will be removed from cooling towers 23 through line 28, a portion thereof being deflected through line 29 to crude oil desalter 30. Water from desalter 30, which will contain only a small amount of entrained oil and water soluble phenols is taken through line 31 and mixed with the balance of the cooling tower blowdown water, and then passed to oil separator 32, oil being withdrawn therefrom through line 33 and effluent water for discharge to the sewer through line 34.

The effectiveness of bacterial oxidation of phenolic contaminants in the cooling towers is exceedingly high as may be seen from the data presented in Table I. This data was obtained in commercial operation of our process during the winter time and shows the amount of phenols present in the make-up water to the cooling towers on various days over a period of about 3 weeks, and the phenol content of the cooling tower blowdown water removed from the cooling towers on each day.

Table I

| Day of Month | Phenols in Make-up (p.p.m.) | Phenols in Blowdown (p.p.m.) | Percent Phenol Removal |
| --- | --- | --- | --- |
| 26 | 16.2 | 0.6 | 96.3 |
| 27 | 18.1 | 0.35 | 98.1 |
| 29 | 7.9 | 0.12 | 98.6 |
| 30 | 16.2 | 0.1 | 99.4 |
| 1 | 18.3 | 0.6 | 96.8 |
| 2 | 14.5 | 0.085 | 99.5 |
| 3 | 16.0 | 0.076 | 99.7 |
| 4 | 15.8 | 0.128 | 99.3 |
| 6 | 17.2 | 0.23 | 98.8 |
| 7 | 16.6 | 0.12 | 99.2 |
| 8 | 16.2 | 0.114 | 99.3 |
| 9 | 16.0 | 0.17 | 98.9 |
| 10 | 17.7 | 0.094 | 99.7 |
| 11 | 17.2 | 0.75 | 95.7 |
| 13 | 16.4 | 0.1 | 99.4 |
| 14 | 18.2 | 0.021 | 99.9 |

An indication of the effect of the introduction of our invention into an oil refinery processing from 75,000 to 80,000 barrels of crude oil per day in reducing total contaminants in the plant effluent, and in reducing water outflow, may be found in the following table.

Table II

| Contaminant | Estimated Amount Per Day Before Introduction | Estimated Amount Per Day After Introduction |
| --- | --- | --- |
| Oil _____ bbl.. | 4 | 1 |
| Phenol _____ lbs.. | 600 | 50 |
| Sulfide _____ lbs.. | 200 | 50 |
| C.O.D. _____ lbs.. | 14,600 | 4,000 |
| B.O.D. _____ lbs.. | 6,400 | 2,000 |
| Water to Effluent Sewer _____ gals.. | 3,000,000 | 1,000,000 |

As may be seen from the foregoing, by proceeding in accordance with our invention it is possible to effect a very substantial reduction in the contaminants discharged from the refinery to the sewers and also to succeed in reducing the total refinery effluent to one-third of that normally passed to waste.

We claim:

1. A process for the treatment of contaminated waters which comprises passing a stream of waste water having an undesirably high biological oxygen demand to a cooling water system, circulating said water in said system between the cold side of an indirect heat exchanger and an evaporative water cooling tower while maintaining the temperature of the water at a value favoring bacterial growth, and substantially eliminating said biological oxygen demand by biochemical means within said cooling water system.

2. A process for the utilization of refinery waste waters which includes passing a water stream into contact with petroleum products comprising water soluble compounds, separating water containing dissolved organic contaminants from the petroleum product, passing the contaminated water to a cooling water system, circulating the water in said system between the cold side of an indirect heat exchanger and an evaporative water cooling tower while maintaining the temperature of the water at a value favoring bacterial growth, and substantially eliminating the dissolved organic contaminants by biochemical means within said cooling water system.

3. A process for the utilization of refinery waste waters which includes passing a water stream into contact with petroleum products comprising water soluble phenolic bodies and hydrogen sulfide, separating water containing dissolved phenolic bodies and hydrogen sulfide from the petroleum products, stripping hydrogen sulfide from the water, separating water insolubles from the water, passing the water and its phenolic contaminants to a cooling water system, circulating the water in said system between the cold side of an indirect heat exchanger and an evaporative water cooling tower while maintaining the temperature of the water at a value favoring bacterial growth, and substantially eliminating the phenolic contaminants by biochemical means within said cooling water system.

References Cited in the file of this patent

UNITED STATES PATENTS

| | | |
| --- | --- | --- |
| 1,437,394 | Brown | Dec. 5, 1922 |
| 2,590,964 | Halvorson | Apr. 1, 1952 |
| 2,704,758 | Wetzel | Mar. 22, 1955 |
| 2,773,003 | Brown et al. | Dec. 4, 1956 |

OTHER REFERENCES

Faulconer et al.: 14th Midyear Meeting, Division of Refining, American Petroleum Institute (1949), pp. 280–286.

Weston et al.: Industrial Wastes, Reinhold Publishing Corp., 330 W. 42nd Street, New York, N.Y., pp. 435–436 (1953).